(12) United States Patent
Sigmon, Jr. et al.

(10) Patent No.: US 8,074,248 B2
(45) Date of Patent: Dec. 6, 2011

(54) SYSTEM AND METHOD FOR PROVIDING VIDEO CONTENT ASSOCIATED WITH A SOURCE IMAGE TO A TELEVISION IN A COMMUNICATION NETWORK

(75) Inventors: Robert B. Sigmon, Jr., Fremont, CA (US); Lena Pavlovskaia, Cupertino, CA (US); Airan Landau, San Jose, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 1194 days.

(21) Appl. No.: 11/258,601

(22) Filed: Oct. 25, 2005

(65) Prior Publication Data

US 2007/0028288 A1    Feb. 1, 2007

Related U.S. Application Data

(60) Provisional application No. 60/702,507, filed on Jul. 26, 2005.

(51) Int. Cl.
  *H04N 7/173*    (2011.01)
  *H04N 5/262*    (2006.01)
(52) U.S. Cl. ............... 725/110; 348/240.25; 348/240.26
(58) Field of Classification Search .................. 725/110, 725/112, 113, 136; 348/240.11, 240.25, 348/240.26
See application file for complete search history.

(56) References Cited

U.S. PATENT DOCUMENTS 3,934,079 A    1/1976 Barnhart ........................ 178/5.1
(Continued)

FOREIGN PATENT DOCUMENTS

EP    0 477 786 A2 *    4/1992
(Continued)

OTHER PUBLICATIONS

Hoarty, "The Smart Headend—A Novel Approach to Interactive Television", Montreux Int'l TV Symposium, Jun. 9, 1995.
(Continued)

*Primary Examiner* — Andrew Koenig
*Assistant Examiner* — James Leija
(74) *Attorney, Agent, or Firm* — Sunstein Kann Murphy & Timbers LLP

(57) ABSTRACT

A system and method for providing video content associated with a source image to a television that is part of a communication network is provided. At least a portion of the source image and the video content are displayed on the television. A request at a content distribution platform in the communication network is received for display of the source image from a communication device associated with the television. In certain embodiments, the communication network is cable television network. In other embodiments, the communication network may be a television over IP network. The requested source image is retrieved by the content distribution platform. The source image is displayed on a user's television, and the user may desire to have video content associated with a link displayed on the user's television. A request for video content associated with the link is then received. The content distribution platform then retrieves the video content that is associated with the link. The video content is pre-encoded and may be, for example, an MPEG data file. The content distribution platform then composites the video content and at least a portion of the source image together. The data of the source image and the pre-encoded video content form a video stream that can be decoded by a decoder associated with the television. The composited video stream is then sent through the communication network to the communication device where it is decoded and displayed on the user's television. In certain embodiments, the source image is a web page.

48 Claims, 6 Drawing Sheets

U.S. PATENT DOCUMENTS

| | | | |
|---|---|---|---|
| 3,997,718 A | 12/1976 | Ricketts et al. | 178/6.8 |
| 4,077,006 A | 2/1978 | Nicholson | 325/308 |
| 4,491,983 A | 1/1985 | Pinnow et al. | 455/612 |
| 4,506,387 A | 3/1985 | Walter | 455/612 |
| 4,538,176 A | 8/1985 | Nakajima et al. | 358/86 |
| 4,554,581 A | 11/1985 | Tentler et al. | 358/120 |
| 4,616,263 A | 10/1986 | Eichelberger | 358/185 |
| 4,709,418 A | 11/1987 | Fox et al. | 455/612 |
| 4,734,764 A | 3/1988 | Pocock et al. | 358/86 |
| 4,763,317 A | 8/1988 | Lehman et al. | 370/58 |
| 4,792,849 A | 12/1988 | McCalley et al. | 358/86 |
| 4,816,905 A | 3/1989 | Tweety et al. | 358/86 |
| 4,829,372 A | 5/1989 | McCalley et al. | 358/86 |
| 4,829,558 A | 5/1989 | Welsh | 372/92 |
| 4,847,698 A | 7/1989 | Freeman | 358/343 |
| 4,847,699 A | 7/1989 | Freeman | 358/343 |
| 4,847,700 A | 7/1989 | Freeman | 358/343 |
| 4,905,094 A | 2/1990 | Pocock et al. | 358/342 |
| 4,918,516 A | 4/1990 | Freeman | 358/86 |
| 4,941,040 A | 7/1990 | Pocock et al. | 358/86 |
| 4,947,244 A | 8/1990 | Fenwick et al. | 358/86 |
| 5,014,125 A | 5/1991 | Pocock et al. | 358/86 |
| 5,093,718 A | 3/1992 | Hoarty et al. | 358/84 |
| 5,119,188 A | 6/1992 | McCalley et al. | 358/86 |
| 5,130,792 A | 7/1992 | Tindell et al. | 358/85 |
| 5,220,420 A | 6/1993 | Hoarty et al. | 358/86 |
| 5,247,347 A | 9/1993 | Letteral et al. | 358/85 |
| 5,319,455 A | 6/1994 | Hoarty et al. | 348/7 |
| 5,361,091 A | 11/1994 | Hoarty et al. | 348/7 |
| 5,410,343 A | 4/1995 | Coddington et al. | 348/7 |
| 5,412,720 A | 5/1995 | Hoarty | 380/15 |
| 5,418,559 A | 5/1995 | Blahut | 348/10 |
| 5,422,674 A | 6/1995 | Hooper et al. | 348/409 |
| 5,442,389 A | 8/1995 | Blahut et al. | 348/7 |
| 5,442,390 A | 8/1995 | Hooper et al. | 348/7 |
| 5,442,700 A | 8/1995 | Snell et al. | 380/15 |
| 5,485,197 A | 1/1996 | Hoarty | 348/7 |
| 5,526,034 A | 6/1996 | Hoarty et al. | 348/7 |
| 5,528,281 A | 6/1996 | Grady et al. | 348/7 |
| 5,539,449 A | 7/1996 | Blahut et al. | 348/7 |
| 5,548,340 A | 8/1996 | Bertram | 348/559 |
| 5,550,578 A | 8/1996 | Hoarty et al. | 348/7 |
| 5,557,316 A | 9/1996 | Hoarty et al. | 348/7 |
| 5,587,734 A | 12/1996 | Lauder et al. | 348/10 |
| 5,594,507 A * | 1/1997 | Hoarty | 348/584 |
| 5,625,404 A | 4/1997 | Grady et al. | 348/7 |
| 5,712,906 A | 1/1998 | Grady et al. | 379/93.17 |
| 5,790,174 A | 8/1998 | Richard, III et al. | 348/7 |
| 5,802,283 A | 9/1998 | Grady et al. | 395/200 |
| 5,812,665 A | 9/1998 | Hoarty et al. | 380/10 |
| 5,883,661 A | 3/1999 | Hoarty | 348/7 |
| 5,903,727 A | 5/1999 | Nielsen | 395/200.42 |
| 6,034,678 A | 3/2000 | Hoarty et al. | 345/327 |
| 6,055,315 A | 4/2000 | Doyle et al. | 380/242 |
| 6,064,377 A | 5/2000 | Hoarty et al. | 345/327 |
| 6,100,883 A | 8/2000 | Hoarty | 345/327 |
| 6,141,693 A * | 10/2000 | Perlman et al. | 709/236 |
| 6,184,878 B1 * | 2/2001 | Alonso et al. | 725/109 |
| 6,198,822 B1 | 3/2001 | Doyle et al. | |
| 6,205,582 B1 | 3/2001 | Hoarty | 725/93 |
| 6,253,238 B1 | 6/2001 | Lauder et al. | 709/217 |
| 6,305,020 B1 | 10/2001 | Hoarty et al. | 725/95 |
| 6,389,075 B2 * | 5/2002 | Wang et al. | 375/240.16 |
| 6,907,574 B2 | 6/2005 | Xu et al. | 715/767 |
| 2002/0027567 A1 * | 3/2002 | Niamir | 345/738 |
| 2002/0067766 A1 | 6/2002 | Sakamoto et al. | 375/240 |
| 2002/0078171 A1 * | 6/2002 | Schneider | 709/218 |
| 2002/0136298 A1 | 9/2002 | Anantharamu et al. | 375/240.12 |
| 2003/0065739 A1 | 4/2003 | Shnier | 709/217 |
| 2003/0135860 A1 | 7/2003 | Dureau | 725/82 |
| 2004/0088375 A1 * | 5/2004 | Sethi et al. | 709/218 |
| 2004/0193648 A1 | 9/2004 | Lai | |
| 2006/0161538 A1 | 7/2006 | Kiilerich | 707/4 |

FOREIGN PATENT DOCUMENTS

| | | | |
|---|---|---|---|
| EP | 1051039 | | 11/2000 |
| FR | 2 529 739 | * | 1/1984 |
| JP | 63 33988 | * | 2/1988 |
| WO | WO 90/13972 | * | 11/1990 |
| WO | WO 93/22877 | * | 11/1993 |
| WO | WO 95/15658 | * | 6/1995 |
| WO | 0038430 | | 6/2000 |
| WO | 03091832 | | 11/2003 |

OTHER PUBLICATIONS

Star, "Video on Demand Without Compression: a Review of the Business Model, Regulation and Future Implication".

International Searching Authority and Written Opinion; PCT/US/2006/022585; Dated Oct. 12, 2007; received Oct. 19, 2007; Authorized Officer Denis Blais.

J. Ozer, *Video Compositing 101*, available from http://www.emedialive.com (Jun. 2, 2004).

T. Porter, et al., *Compositing Digital Images*, 18 Computer Graphics (No. 3) 253-259 (Jul. 1984).

Hance, Robert, Office Action, dated Sep. 2, 2008, U.S. Appl. No. 11/258,602, filed Oct. 25, 2005.

Examiner Robert J. Hance, Office Action, dated Feb. 23, 2009, U.S. Appl. No. 11/258,602, filed Oct. 25, 2005.

* cited by examiner

SYSTEM AND METHOD FOR PROVIDING VIDEO CONTENT ASSOCIATED WITH A SOURCE IMAGE TO A TELEVISION IN A COMMUNICATION NETWORK

PRIORITY

The present U.S. patent application claims priority from U.S. provisional patent application having Ser. No. 60/702,507, filed on Jul. 26, 2005 entitled "System and Method for Providing Video Content Associated with a Source Image to a Television in a Communication Network," which is incorporated herein by reference in its entirety.

TECHNICAL FIELD AND BACKGROUND ART

The present invention relates to displaying video content, such as, for example internet video content, on a television in a communications network.

It is known in the prior art to display video content on a computer that is attached to the Internet as shown in FIG. 1. A user of a client computer 100 having an associated web browser 110 can request the display of a web page 120 from a server computer 130 by providing the URL (universal resource locator) for the web page 120. When the client computer 100 receives the web page 120, the web page 120 is rendered in a web browser 110. The displayed webpage 120 is a document that contains content in a format, such as HTML, along with links to other content, such as video content 150. The user of the client computer can request the display of the video content 150 by selecting the link. This selection requests the transmission of the video content from the server computer 130 through the Internet 140. The video content may be in any one of a number of different formats. For example, the content may be in Apple® Computer's Quicktime format, MPEG-2 format, or Microsoft's® Window's Media format. After the user has requested the video content 150, the video content 150 is transmitted to the client's computer 100 from the address associated with the link. Given that the video is in a particular format and is generally compressed, the video 150 must be decoded by the client computer 100. The video content 150 is decoded by a program separate from the web browser which may be a plug-in 160 to the web browser 110. The plug-in 160 is run and decodes the video content 150 and displays the video content 150 within the client's web browser. In other systems, the web browser accesses a separate program that displays the content.

In communication networks wherein the requesting device does not have the capability to separately decode video content from the web page content, the previously described client plug-in architecture will not work. An example of such a system is an interactive cable television system 200 that supports web browsing on televisions 210. The web content 230 is rendered at a remote location, such as a cable head end 240 as shown in FIG. 2. Such a cable television system 200 allows a subscriber to make a request for content using a communication device, such as a set top box 250. The request is sent to the cable headend 240 from a subscriber's set top box 250 and the head end 240 accesses the web page 230 from a server 260, renders the web page 270, encodes the web page 270 in a format that the set top box 250 can decode, and then transmits the webpage 230 to the set top box. If the web page 230 contains a link to video content 220 and the subscriber requests the display of the video content 220, the video content must be encoded in the format that the set top box can decode, such as MPEG-2 content. As such, the head end retrieves the video content associated with the requested link. The head end decodes the video content using an applicable program 280 and then re-encodes the video content 270 along with the web page in the format that the set top box can decode. Thus, each frame of video along with the substantially static webpage background is encoded. Such a process is time consuming, and resource intensive, particularly for streaming video. Additionally, because the video content needs to be decoded and re-encoded, information is lost, and therefore the displayed video has less resolution than the originally encoded video content.

SUMMARY OF THE INVENTION

In a first embodiment of the invention there is provided a system and method to provide displayed video content associated with a web page or other source image on a television in a communication network. A request at a content distribution platform in the communication network is received for display of the source image from a communication device associated with a television. In certain embodiments, the communication network is a cable television network. In other embodiments, the communication network may be a television over IP network. The content distribution platform retrieves the requested source image and displays the source image on a user's television. The user can then request video content by selecting a link on the source image. The request for video content associated with the link is then received by the content distribution platform. The content distribution platform retrieves the video content that is associated with the link if it is not already available to the platform in a pre-encoded file. The video content is pre-encoded and may be, for example, an MPEG data file. The content distribution platform then composites the video content and at least a portion of the source image together to form a video stream that can be decoded by the communication device and displayed on the television. The composited video stream is then sent through the communication network to the communication device where it is decoded and displayed on the requesting user's television. In one embodiment, at least a portion of the source image is encoded prior to compositing the web page and the video content together. The source image can be encoded in real-time using an MPEG encoder. In certain embodiments, a portion of data from the source image overlaid by the video content is discarded prior to the macro blocks of the web page being encoded.

In one embodiment, the communication device associated with the television includes a decoder capable of decoding an MPEG video stream. The communication device may be, for example, a set-top box or a cable card. In other embodiments, the communication device and the decoder are separate entities. The decoder can be a self-contained device or part of the television.

In another embodiment of the invention, prior to a request for playback of video content, the content distribution platform locates links associated with video content on a source image, such as a web page. The video content may or may not be in a format that is compatible with the decoder. The content distribution platform then downloads the video content and if the video content is not in a compatible format, the content distribution platform decodes and re-encodes the video content, so that the video content is decodable by the decoder. The video content is therefore in the process of being pre-encoded or is already pre-encoded prior to a user making a request for the video content, thus allowing the video content to be sent quicker than if the content distribution platform waited for a request to be made for the video content. The video content can also be shared amongst other users that share the same distribution platform.

The system for processing video content associated with a link includes a plurality of modules including: a receiver for receiving a request for transmission of video content associated with a link and providing the request to a retriever. The retriever retrieves the video content associated with the link. The system includes a compositor that includes an encoder that encodes at least a portion of the source image/web page into a format that the communication device can decode. The compositor then creates a composite stream based upon the encoded web page/source image and the video content that can be decoded by the communication device. A transmitter within the system transmits via a communication network the composite stream for display on a television associated with the request. In other embodiments, the receiver and transmitter are combined together as a transceiver. In still other embodiments, multiple modules may be combined together and may be comprised of hardware, software or both hardware and software.

In yet another embodiment of the system, a request for display of a web page is received by a receiver. The receiver provides the request to a retriever, wherein the receiver subsequently receives a request for display of the video content associated with a link on the web page. The retriever retrieves the web page and retrieves the video content associated with the link. In such an embodiment, the compositor creates a composite data stream based on information in the retrieved webpage and the pre-encoded video content. The transmitter then transmits the composite stream for display on a television associated with the request. The system may include a decoder associated with the television for decoding the received video content.

As already stated, the communication device may include a decoder be capable of decoding an MPEG stream and the web page and the encoded/pre-encoded video content are composited together as an MPEG video stream in certain embodiments.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions: In the specification the following terms shall having the meaning given unless the context indicates otherwise. The term "frame" shall refer to both fields and frames as is understood by those in the compression arts. The term "video content" may include audio. The term "source image" shall refer to static graphical content capable of being displayed on a television, as well as, dynamic graphical content. The term source image includes, but is not limited to web pages.

Figure 1:
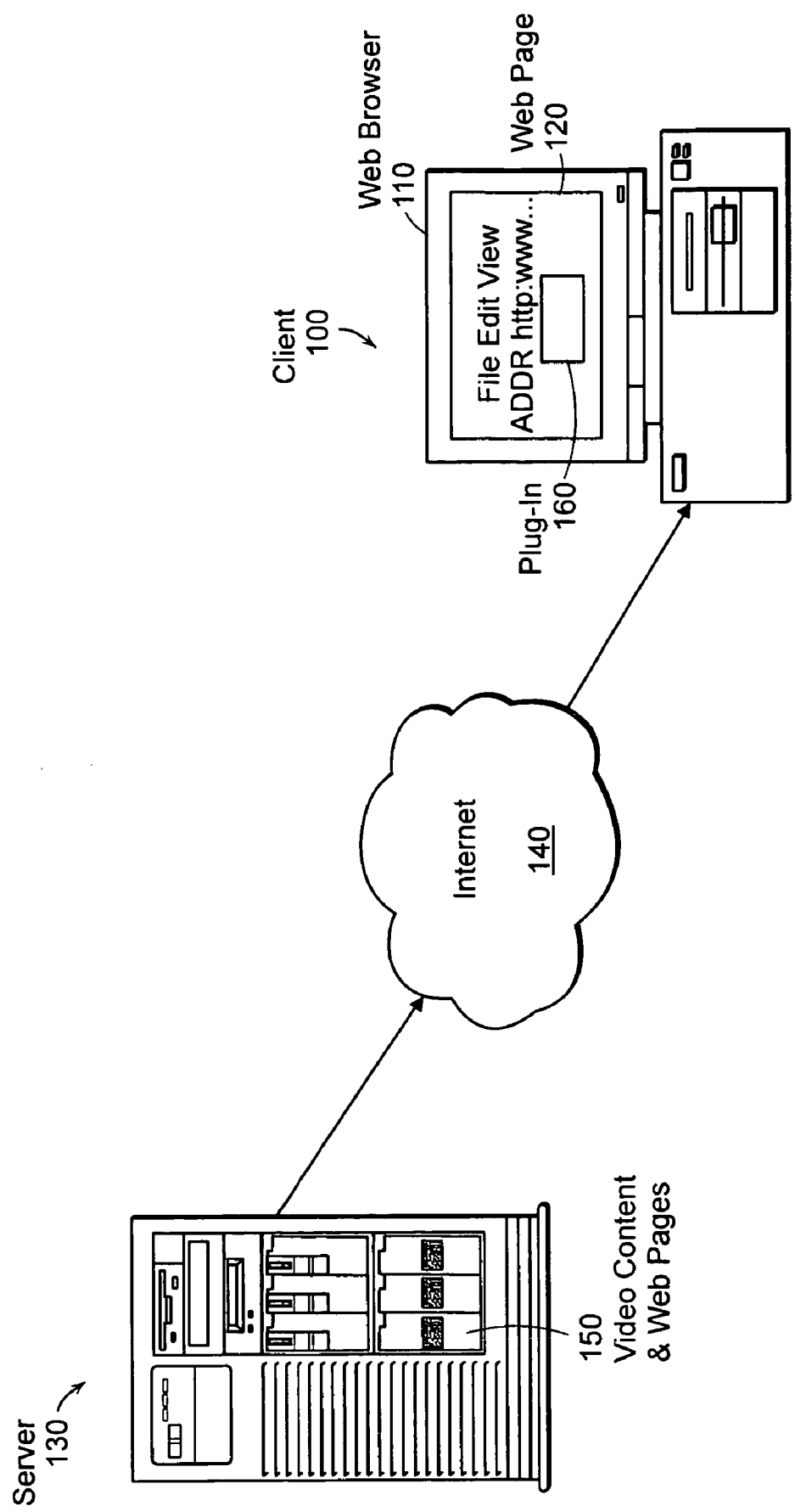
FIG. 1 is a first prior art environment for displaying video content from the Internet.
Figure 2:
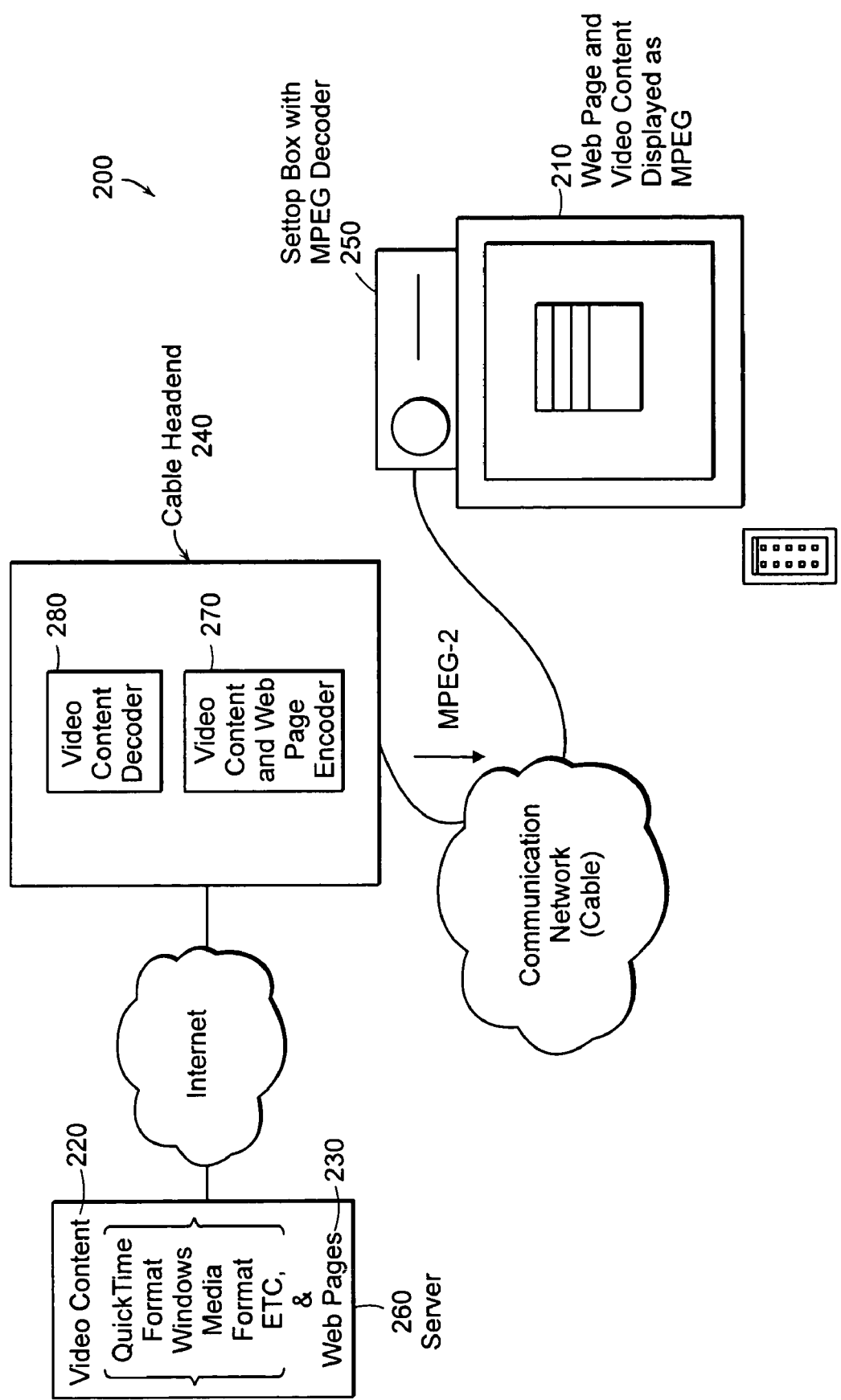
FIG. 2 is a second prior art environment for displaying video content from the Internet.
Figure 3:
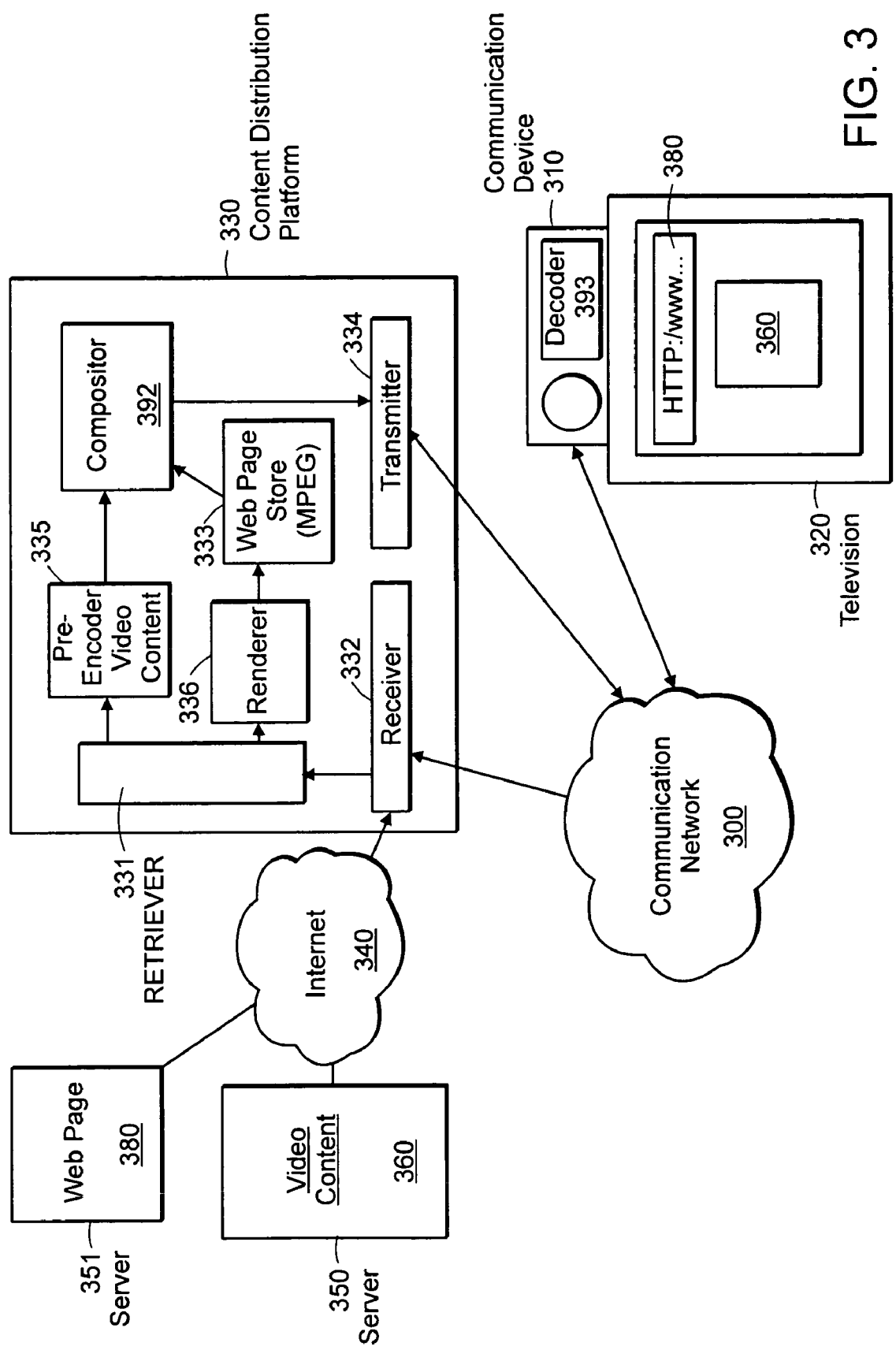
FIG. 3 is an environment showing a first embodiment of the invention.

FIG. 3 shows an environment for implementing an embodiment of the invention. The environment is designed to allow a television 320 associated with a decoder and coupled to a communication network to display video content 360 in combination with a web page or a source image. For example, a source image may be a cable television system's proprietary graphical image. The video content and source image/web page can reside in a limited-content network wherein the video content is pre-encoded in a format decodable by a decoder 393 associated with the television 320 or the video content and web page/source image may reside in an open access network wherein the video content may or may not be pre-encoded in a format that is decodable by the decoder associated with the television.

In such an environment, the television 320 is associated with a communication device 310. The communication device 310 performs limited processing tasks, such as receiving input instructions and content and formatting output instructions. The communication device, in this embodiment, includes decoder 393 for decoding video content in known formats. For example, the communication device 310 may be a set top box which is capable of receiving a digital data signal and decoding MPEG video. Examples of such set-top boxes include Motorola's DCT 200 and Amino Communications, Ltd AmiNet 110. The communication device 310 does not perform any rendering of content. All general purpose processing is performed at a content distribution platform 330, which may be at a central location, such as, a head end in a cable television network. Examples of other locations for the content distribution platforms include a central switching office for a telephone system and intermediate processing facilities, such as an ISP (Internet Service Provider). Additionally, the content distribution platform may reside at a location separate from the network's central location. Further, each module within the content distribution platform can be distributed as the modules operate as a logical network. The content distribution platform 330 includes a plurality of processors. Each processor may be associated with one or more interactive television processes. For example, the interactive processes may be the display of a movie on demand or the ability to access the internet. Thus, a user may request an interactive session from the content distribution platform using an input device by sending a predefined request signal to the content distribution platform using a subscriber input device. U.S. Pat. No. 6,100,883 (which is incorporated herein by reference in its entirety) shows such an environment wherein a content distribution platform has the foregoing features. In order to simplify explanation, embodiments of the invention will refer to web pages; however this should not be interpreted as limiting the scope of the invention to web pages and other source images may also be used.

In the embodiment that is shown in FIG. 3, the communication device 310, such as a set-top box, receives a request for an interactive session for accessing a web page from a user input device 390, such as, a remote control or a wired wireless keyboard. The request is forwarded to the content distribution platform 330 through a communication network 300. The content distribution platform 330 receives the request at a transceiver input and assigns a processor for the interactive session. The transceiver is made up of a transmitter 334 and receiver 332. The request includes at least indicia of the web page 380 and of the communication device. For example, the indicia may be the address of the web page/communication device or a code that can be located in a look-up table that is associated with the address. The web page address may be a Universal Resource Locator (URL).

The content distribution platform 330 contains a transceiver (332,334), a pre-encoder 335, storage (memory) 333, a stream compositor 392 and a retrieving module 331. All of the functions performed by these modules may be performed by a single processor or each module may be a separate processor. Further, the storage/memory 333 may be part of the processor or separate from the processor.

It should be understood that FIG. 3 shows the individual modules that are used for a single interactive session requesting video content in conjunction with a web page. As stated above, the content distribution platform can contain a plurality of processors and each processor can control multiple simultaneous interactive sessions. Therefore, the content distribution platform may contain multiple copies of the shown modules on separate processors. It should be noted that some of the modules may be shared by multiple sessions and therefore, not all modules need be part of the same processor. For example, a content distribution platform may have only a single transceiver that is shared by many processors each maintaining at least one interactive session.

As previously mentioned, the present invention as embodied may be used with open access networks, such as the internet, or with closed access networks. In closed access networks where the video content is already in a format decodable by the decoder associated with the television, the content distribution platform need not decode and re-encode the video content using a pre-encoder module. In such a closed access network, the pre-encoder module need not be part of the content distribution platform.

In an open access network, the content distribution platform parses and reviews the links on a requested web-page. If a link indicates that the video content is not in a format decodable by the decoder, the content distribution platform can pre-retrieve the video content for re-encoding. The content distribution platform can perform this check by scanning the web page code (e.g. HTML) for known video content extensions. If the link indicates video content is in the proper format, the content distribution platform can wait until receiving a request for that link before retrieving the video content.

In one example of how content distribution platform operates, the content distribution platform 330 receives a request for a web page 380. The retriever 331 forwards that request along with the return address for the content distribution platform using the transceiver (332,334) through a network, such as the internet, a LAN (local-area network) or a WAN (wide-area network) 340 to a server 350 associated with the address provided by the requesting communication device 310. The server 350 receives the request and responds to the request by sending the requested web page 380 to the transceiver (332,334) of the content distribution platform. The transceiver of the content distribution platform sends the requested web page to a renderer 336. The renderer 336 produces a rendered version of the web page placing the rendered version into a memory 333 that is accessed by an encoder that is part of the stream compositor 392. The web page may be rendered by accessing a web browser program and producing a video data output. The encoder of the stream compositor 392 encodes the renderer's output and stores the resulting web page date in memory 333. The web page is encoded as an MPEG (MPEG-2, MPEG-4) video frame and is also provided to the communication device 310 as an MPEG video stream. For example, the MPEG video frame may be repeatedly transmitted until the web page is updated by the server 350. For the remainder of this specification, it will be presumed that the communication device 310 includes a decoder 393 that can decode MPEG encoded video and that the content distribution platform encodes the content into an MPEG format. This will be done for simplification of explanation and in no way should be seen as limiting the invention to MPEG encoding schemes. Further, having the decoder within the communication device also should not be interpreted as limiting.

The retriever module 331 searches the web page for any links or other associated video content. If a link is found on the web page that is associated with video content not in a decodable format by the decoder associated with the television, the retriever 331 will make a request to the server 350 for the video content. Video content can be readily identified by the file name and associated extension (ex. mpg, avi, qt, mov etc.) When the video content 360 is received by the retriever 331, the retriever will forward the video content to the renderer 336 which provides the content to the pre-encoder 335. The pre-encoder 335 will decode the video content and re-encode the video content into a valid format for the communication device. The content is then stored to memory 333 and will only be retrieved if a user makes a request for such video content. By pre-encoding the video content prior to receiving a request for the video content, the video content will be either encoded or already in process of being encoded when requested, allowing the video content to be transmitted more rapidly than if the content is retrieved when a request is received. Further, once the video content is pre-encoded, the video content can be stored in memory and saved for later retrieval by another user of the system or for another session by the same user. The pre-encoder may also serve to perform off-line pre-encoding of known content. For example, if a user selects a website, the pre-encoder may access and begin pre-encoding all content from web pages associated with the website that is not in a format decodable by decoders within the network. Thus, in a cable television network in which a plurality of subscribers share the same content distribution platform, the video content is accessible and pre-encoded for all subscribers. Thus, the pre-encoded content can improve the time between a request being made and the display of video content on the television of the requesting subscriber.

If the content distribution platform is configured to allow sharing of pre-encoded content among multiple users of the network, the pre-encoded content can be stored in a repository. The repository may be located either locally or remotely from the content distribution platform. In such an embodiment, the content distribution platform includes a management module. The management module maintains the repository and contains a database of information regarding the pre-encoded content. The management module maintains a data structure that indicates the file name and the storage location within memory of the repository. For each pre-encoded content file, the database may include parameters indicating: whether the content is time sensitive, the time that the content was retrieved, the location from where the content was retrieved, the recording format of the content, a user identifier regarding the last person to request the content, a counter identifying the number of times the content is accessed. Additionally, the database can include other parameters.

Each time a user requests content, the management module searches the repository to determine if the repository contains the requested content. If the content is stored in the repository, the management module determines if the content is time sensitive content by accessing the database. If a parameter in the database indicates that the content is time sensitive, the management module requests information from the server providing the content to determine if the repository contains the most recent version of the content. For example, the management module may obtain a version number for the content or a timestamp of when the content was created/posted. The management module compares this information to the data in the database. If the repository contains the most recent version of the content, the management module directs the pre-encoded version of the content to the television of the requesting user. If the repository does not contain the most recent version of the content, the management module requests the content from the server. The management module causes the content distribution platform to transcodes the requested content into a format that the decoder associated with the requesting television can decode. The content distribution platform then distributes the encoded content to the device associated with the requesting television.

In certain embodiments, the management module includes an algorithm for determining how long to maintain a pre-encoded file. The management module may have a fixed period for maintaining the content, for example 24 hours. Any pre-encoded content file that includes a timestamp that falls outside of the previous 24 hour period is purged from the repository. In other embodiments, the management module maintains content based upon popularity (i.e. the number of times a file is accessed within a given time period). For example, the algorithm may maintain the top 1000 content files wherein a database keeps a counter for each file that a user accesses. The management module may maintain content using a combination of time and popularity, where the management module uses a weighting factor based upon popularity. For example, each file may be maintained for a set time period of 6 hours, but if the file is within the top 100 accessed files, the file will be maintained for an additional 6 hours. By regularly purging the repository, the repository memory can be efficiently used.

In certain embodiments, the pre-encoded content can be maintained locally to a group of end users or to a single user. For example, the system maintains pre-encoded content for users within a 10 block radius. Thus, the management module is also situated locally with the pre-encoded content. Therefore, different localities may have different pre-encoded content. This would be preferable for city-wide or national systems, where local content (news, sports, weather) would be more likely to be pre-encoded and stored for the local users of the system.

If the network is a closed network, the retriever does not need to parse through the links nor does the video content need to be pre-encoded, since all of the video content is already in a format that is decodable by the decoder at the requesting television.

A subscriber then makes a request for video content 360 associated with a link on the requested web page 380 by using the user input device 390 to select the link. The requested web page 380 and the requested video content 360 although associated, may reside on different servers 350, 351. The link information is passed through the communication network 300 to the content distribution platform 330 and the content distribution platform 330 requests the video content or retrieves the video content from memory depending on whether the video content needed to be pre-encoded.

An example of such a communication network for selecting a link of a web page that is displayed on a television is taught in U.S. patent application Ser. No. 10/895,776 entitled "Television Signal Transmission of Interlinked Data and Navigation Information for use By a Chaser Program" that is assigned to the same assignee and is incorporated herein by reference in its entirety. Reference to this application should not be viewed as limiting the invention to this particular communication network.

The compositor 392 retrieves the stored web page data and the video content which is encoded as MPEG data. The web page and the video content are then composited together. The web page is saved as a series of macro blocks which are a subset of pixels (ex. 16×16) which together comprise an entire frame of video. Each macro block of the web page is separately processed. The display position (macro block position) of the video content may be predetermined or determined during compositing by compositor 392. Macro blocks within the web page that are to be overlaid by the video content are not processed. The macro blocks of the video content are then inserted in place of the macro blocks of the web page that are not processed. In order to provide continuity, the video content may need to be padded with pixels if the video content is not defined in perfect macro block increments. In addition to the top left corner of the video content window being aligned to a macro block boundary, the right and bottom corner must also be aligned (the height and width must be divisible by 16). For example, if the video content is 100×100 pixels in size and each macro block is 16 pixels by 16 pixels square, it would take 7×7 macroblocks (112 pixels by 112 pixels) to present the video content and therefore, there would be a border around the video content that is 12 pixels wide. The content distribution platform would insert this border and the border could be made any desired color. For example, the content distribution platform may make the border pixels black. This process is performed for all video content to be displayed.

Each composited frame is then transmitted by the transceiver (332,334) through the communication network 300 to the communication device. The communication device 310 can then use decoder 393 to decode the MPEG video stream and provide the output to the television set. The video content 360 will then be displayed on the television 320. Thus, it appears to a viewer of the television that the web page is rendered locally with the video content, even though the rendering occurs on the content distribution platform. It should be understood that the communication device may include a digital to analog converter for converting the MPEG video stream to an analog signal for display on an analog television or for providing the MPEG video stream to a component, composite or other analog input on a digital television.

Figure 4:
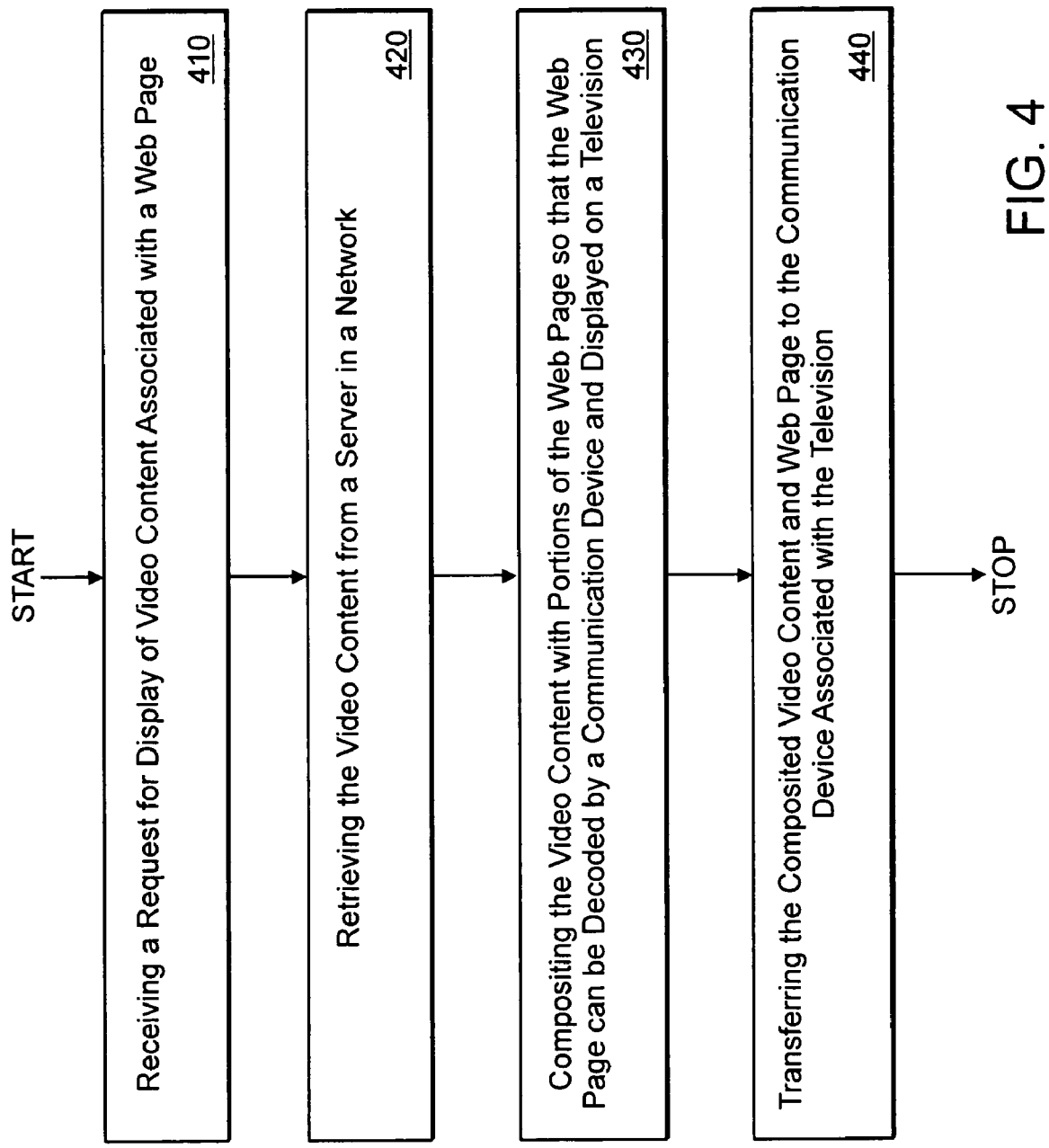
FIG. 4 is a flow chart of one embodiment of the invention for accelerating delivery of video content to a television in a communication network.

FIG. 4 is a flow chart showing the methodology employed at the content distribution platform when a user selects a link on a web page for display of video content. The content distribution platform receives a request for display of video content associated with a link on the displayed web page (410). The request is sent from the communication device and includes a representation of the web address for the video content. For example, the set-top box/communication device may transmit a signal that represents a direction/relative location on the display. In one embodiment, the platform contains a predetermined map for associating a user's input with a link. In another an embodiment, the position of each link on the web page is mapped upon receiving the web page and the content distribution platform creates a look-up table that associates the directional command with a link. Based upon this received directional signal, the content distribution platform can relate the direction/relative location signal to the desired link from the web page. Further explanation regarding embodiments of mapping links with directional commands is disclosed in U.S. patent application Ser. No. 09/997, 608 entitled, "System and Method for Hyperlink Navigation Between Frames" that is assigned to the same assignee and is incorporated herein by reference in its entirety.

The content distribution platform then retrieves the video content (420). If the video content is already in a format that is decodable by the decoder associated with the requesting television, the content distribution directs the request with the address of the link to the server through the Internet to retrieve the video content. The server receives the request for the video content and forwards the video content to the content distribution platform. The content distribution platform, which has maintained an active interactive session with the communication device requesting the video content, receives the video content and associates the video content with the interactive session. The video content is preferably an MPEG stream. Additionally, the content distribution platform may receive periodic updates of the Web Page data (RGB data received into a video buffer which is converted into YUV image data). If the video content was not in a format that is decodable by the decoder and was previously retrieved and pre-encoded, the content distribution platform retrieves the pre-encoded video content from memory.

The content distribution platform then composites the pre-encoded video content and the web page together 430. The compositor creates an MPEG video stream from the web page data and the MPEG video content. For each frame of the MPEG video stream transmitted to the decoder, the compositor encodes each macro block of the web page data in real-time and inserts the pre-encoded video content into the encoded web page macro block data.

The compositor divides the data (YUV data) of the web page into macro blocks and determines the position for display of the video content within the web page. The position relates to the macro block locations for the video content when displayed on a display device. For each frame of the MPEG stream, the compositor parses the video content into frames and determines the frame-type of the video content frame. After the frame-type is determined, the macro blocks of the web page are encoded in real-time based upon the type of frame. The macro blocks of the web page data that overlap with the video content are not encoded and are discarded. The compositor splices the encoded video content macro blocks in with the encoded web page macro blocks at the pre-determined position. This compositing step continues for each frame of video content.

The web page data is repeatedly used in the compositing process; however all of the information need not be transmitted, since much of each web page is temporally static. The same encoded web page data can be reused, until the web page changes. As explained below, the web page macro block data is encoded in real-time and the manner in which it is encoded (as an interframe or intra frame block etc.) is determined based upon the type of frame of the video content that is being composited with the encoded web page.

Since the content distribution platform maintains an internet session with the server from which the web page was received, the content distribution platform may receive updated content for a web page. When such an update is received, the content distribution platform replaces the old web page with the content of the new web page. The compositor encodes the new web page content, discards macro blocks that overlap with the video content, and splices the video content with the new encoded web page content as explained above with respect to 430 and below in FIG. 5.

As each frame is composited, the frame is transmitted into the communication network to the address associated with the communication device (440). The communication device then decodes the composited MPEG video stream and displays the stream on the television set. To the subscriber, the image on the television set appears as if the television is rendering the web page and video content in a web browser, when in actuality, the images on the television are merely decoded MPEG video frames.

Figure 5:
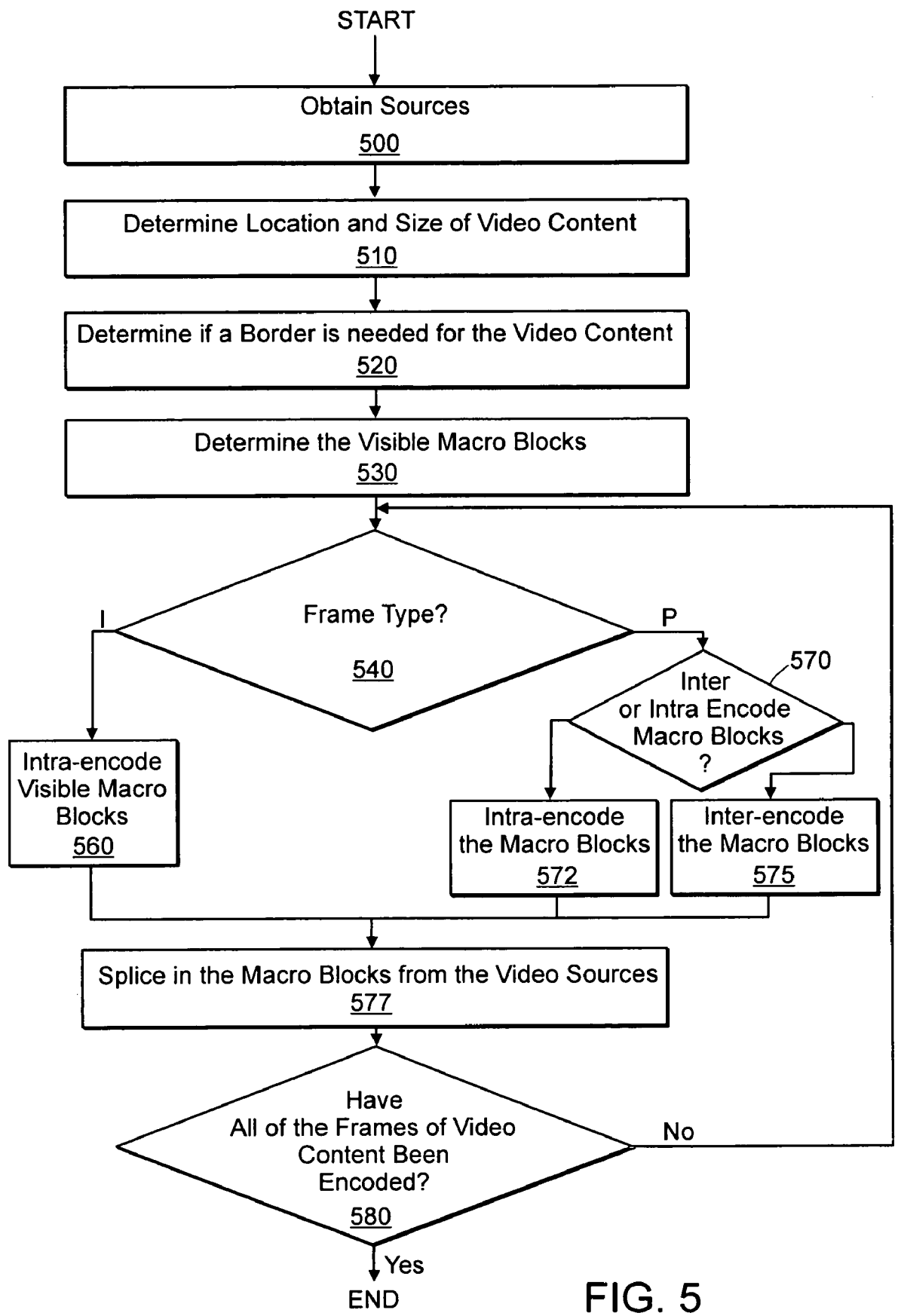
FIG. 5 is a flow chart that further explains the methodology of compositing video source material and background material.

FIG. 5 is a flow chart that elaborates on the compositing process performed by the compositor. First, the sources to be displayed are determined and are obtained (500). A request for content is issued by a user. For example, a user requests the display of a pre-encoded video source by selecting a link on a web page. Thus, there are at least two sources of information: a background image, the web page, and a foreground image, the video content. It should be recognized that the background, the web page, is not encoded when received by the compositor, whereas foreground, the video content is received as pre-encoded data. Further, there may be more than one video source. The additional video sources may be part of the web page. An example of a web page that contains two video sources is presented in FIG. 6 wherein the video sources are labeled X and Y.

The location and size of the video content with respect to the background is next determined by the content distribution platform (510). The location may be predefined with respect to the background, for example the video content associated with the link may be centered at the center of the background. Similarly, the size of the video content may be preset. The content distribution platform may allow the video content to be shown at its native resolution. In other embodiments, the size of the video content may be limited to a number of macro blocks (e.g. 10×10, 15×15 etc.). In such embodiments, the compositor scales the video content as is known to those in the art. Once the location and size are fixed, the compositor determines whether any border region is necessary, so that the video source material lies on a macro block boundary of the background 520.

Figure 6:
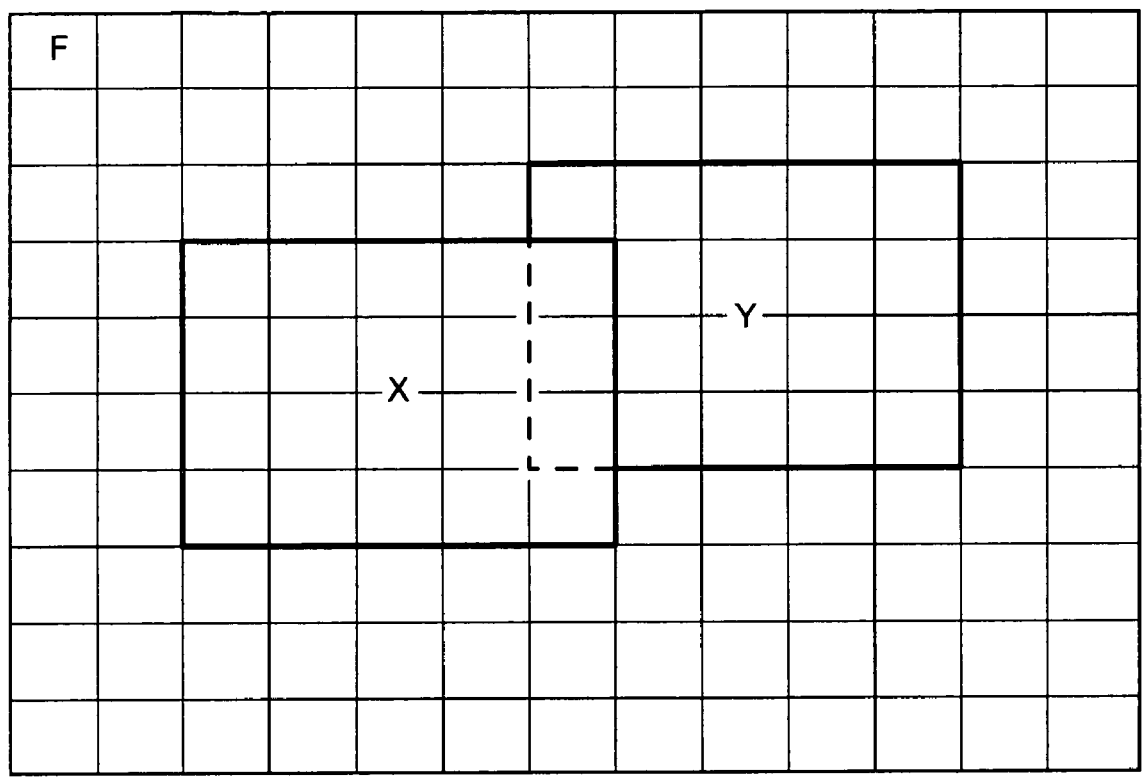
FIG. 6 is an image that shows a frame of video content in which there is a background image and two video sources X and Y.

Next, the visible macro blocks are determined 530. A visible macro block is a macro block that is not obscured by another macro block that overlays it. The selected pre-encoded video content overlays a portion of the web page and therefore, obscures a section of the web page. As shown in FIG. 6, frame F is broken up into a plurality of macro blocks. Macro blocks from the two video content sources X and Y overlap with each other and also overlap with the frame background F. Video content source X lies on top of some of the macro blocks of video source Y, and both X and Y lie on top of the frame background. As a result, not all of video source Y is displayed. Similarly, not all of the macroblocks of the frame background are displayed. The content distribution platform determines the top most macro block for each macroblock in the frame.

The compositor then begins to encode each frame of the MPEG stream. First the overall frame type is determined. The compositor inquires whether the frame should be an I or a P MPEG frame 540. Frame type is selected based upon the frame type of the video content that is being composited with the background. If the frame type of the current frame of any of the video sources content is a P type frame, then the overall frame type will be a P frame. If the frame type of the video content source(s) is an I frame, then the overall frame type will be an I frame. Referencing FIG. 6, if the current video frame for video source X is an I frame, and the current video frame for video source Y is a P frame, then the overall frame type will be a P frame. If the frame type of all of the video content that is to be composited is I type (ex. X and Y are I frames), then the overall frame type is an I frame. Once the overall frame type is determined, the MPEG frame headers are written.

Next the macroblocks are each systematically and individually processed. The compositor inquires if the current macroblock being processed is already pre-encoded, and therefore, part of the video content (550). If the answer is no, the macro block contains data from the web page. If the compositor has determined that the overall frame type is a P type frame, the encoder decides whether to encode the web page macro block as an intercoded macroblock or as an intracoded macro block (570). The encoder will generally encode the macro block as an interceded macroblock (575), but if there are changes above a threshold in the data content of the macroblock as compared to the macro block at the same location from the previously encoded frame, the encoder will encode the macro block as an intracoded macro block (572). If the overall frame type is an I type frame, the web page macro block is intracoded (560). Thus, only the background/non-video content material is real-time encoded. If the macro-block does contain pre-encoded data (video content), the video content macro block is spliced into the macro block sequence regardless of the overall frame type (577). The encoding methodology is repeated for each macroblock until the frame is complete (578). Once a frame is completely encoded, the content distribution platform inquires whether each of the frames of video content within the video sequence have been encoded (580). If all of the video content has been encoded or the communication device sends a stop command to the content distribution platform, the sequence ends and compositing stops. If all of the frames have not been processed, then the process returns to block 540.

As the background and the video content are composited together frame by frame and constructed into an MPEG data stream, the encoded MPEG stream is sent to the communication device through the communication network and is decoded by the decoder and displayed on the subscriber's television.

In the previous example, it was assumed that the background was a web page from the internet. The background need not be a web page and may come from other sources. For example, the background may be a cable operator's background image and not a web page, wherein video content is composited with the cable operator's background.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. A method for processing video content including a plurality of video frames, the video content addressed by a link on a web page, for display of the video content and web page on a television, the television coupled to a communication network through a communication device, the method comprising:
receiving a request for display of the web page, from the communication device, at a content distribution platform in the communication network; retrieving the web page;
locating on the web page at least one link to the video content; retrieving the video content addressed by the link;
encoding the video content, in a format decodable by the communication device, prior to receiving a request for display of the video content from the communication device; and
upon receiving the request for display of the video content, forming a sequence of encoded video frames in a format decodable by the communication device, each encoded video frame being formed by compositing at least a portion of a frame of the encoded video content with at least a portion of the web page, wherein compositing includes selecting a frame type from a plurality of frame types based on the frame type of the portion of the frame and encoding the portion of the web page according to the selected frame type.

2. The method according to claim 1, wherein a portion of the web page is removed and the compositor, when forming each encoded video frame, inserts the encoded video content at a location of the web page where the removed portion was located.

3. The method according to claim 1, further comprising:
receiving a request to view the video content associated with the link.

4. The method according to claim 3, further comprising:
transmitting the composited sequence of encoded video frames through the communication network to the communication device that transmitted the request.

5. The method according to claim 3, wherein at least a portion of the web page is encoded as an MPEG frame prior to compositing and after receiving the request for display of the video content.

6. The method according to claim 1, wherein pre-encoding the video content includes compressing data of the video content.

7. The method according to claim 6, wherein the data of the video content is compressed using MPEG-based compression.

8. The method according to claim 7 wherein the video content is compressed as series of MPEG frames.

9. The method according to claim 1, wherein retrieving the video content comprises:
searching a repository of video content for the requested content;
if the content is in the repository, determining whether the content is time-sensitive; and
if the content is time-sensitive, determining whether the content is the most recent version of the content.

10. The method according to claim 9, wherein determining whether the content is the most recent version of the content includes comparing a timestamp associated with the video content in the repository to a timestamp of the video content associated with the link.

11. The method according to claim 9, wherein retrieving the video content includes, if video content is the most recent version of the video content, retrieving the video content from the repository of video content.

12. The method according to claim 9, wherein retrieving the video content includes, if the video content is not the most recent version of the video content, requesting the video content from a source associated with the link.

13. The method according to claim 9, wherein the repository of video content is located remotely from the content distribution platform.

14. The method according to claim 1, further comprising:
determining a group of end users associated with the video content, each user in the group of end users having a communication device associated with a television.

15. The method according to claim 14, wherein the group of end users consists of a single user.

16. The method according to claim 14, wherein the group of end users is defined using a national boundary, a city boundary, or a circle having a given center and radius.

17. The method according to claim 1, wherein the selected frame type of each encoded video frame is I-frame or P-frame.

18. The method according to claim 17, wherein the video content comprises a plurality of video sources, each video source having a plurality of video frames, and each encoded video frame includes, from each of the plurality of video sources, at least a portion of a video frame, the method further comprising:
selecting the frame type of the encoded video frame to be I-frame if the frame type of each of the included portions is also I-frame.

19. The method according to claim 17, wherein the video content comprises a plurality of video sources, each video source having a plurality of video frames, and each encoded video frame includes, from each of the plurality of video sources, at least a portion of a video frame, the method further comprising:
selecting the frame type of the encoded video frame to be P-frame if the frame type of at least one of the included portions is also P-frame.

20. The method according to claim 1, wherein selecting the frame type includes selecting based on the encoding type of one or more macroblocks of the portion of the frame.

21. A system for providing video content including a plurality of video frames, the video content addressed by a link on a web page, to a decoder associated with a television for display, the system comprising:
a receiver for receiving a request for transmission of the web page wherein the web page has one or more links addressing video content, wherein the receiver subsequently receives a request for display of the video content addressed by the link;
a retriever for receiving the request from the receiver and retrieving the web page, and for retrieving video content addressed by the link on the web page;
an encoder for encoding the video content into a format decodable by the decoder, wherein the encoder is configured to begin encoding the video content prior to the receiver receiving the request for transmission of the video content, the encoder also being capable of encoding the web page according to a frame type;
a compositor for creating a sequence of composite video frames in response to the receiver receiving the request for display of the video content, wherein for each composite video frame the compositor selects a frame type for the composite video frame based on the frame type of an encoded frame of the video content, and combines at least a portion of the encoded web page with the encoded frame of video content, the web page being encoded according to the selected frame type of the composite video frame; and
a transmitter for transmitting via a communication network the encoded stream for display on a television associated with the requests.

22. The system according to claim 21, wherein the encoder encodes the web page with a portion of the web page removed and the compositor creates a series of video frames that includes the encoded video content inserted into the removed portion of the encoded webpage.

23. The system according to claim 22, wherein the encoder encodes the video content into an MPEG format.

24. The system according to claim 23 wherein the encoder can decode previously encoded video content.

25. The system according to claim 21 wherein the encoder encodes the video content as a series of MPEG frames.

26. The system according to claim 25 wherein the encoder encodes at least a portion of the sequence of video frames as one or more MPEG frames and the compositor combines the MPEG frames.

27. The method according to claim 21, wherein the selected frame type of each encoded video frame is I-frame or P-frame.

28. The method according to claim 27, wherein the video content comprises a plurality of video sources, each video source having a plurality of video frames, and each encoded video frame includes, from each of the plurality of video sources, at least a portion of a video frame, the method further comprising:
selecting the frame type of the encoded video frame to be I-frame if the frame type of each of the included portions is also I-frame.

29. The method according to claim 27, wherein the video content comprises a plurality of video sources, each video source having a plurality of video frames, and each encoded video frame includes, from each of the plurality of video sources, at least a portion of a video frame, the method further comprising:
selecting the frame type of the encoded video frame to be P-frame if the frame type of at least one of the included portions is also P-frame.

30. The system according to claim 21, wherein selecting the frame type includes selecting based on the encoding type of one or more macroblocks of the portion of the frame.

31. A method for providing encoded video content associated with a link on a source image to a decoder associated with a television, the method comprising:
receiving a request for transmission of the video content, the encoded video content including a plurality of video frames;
retrieving the video content from the link;
creating a series of composite frames that can be decoded by the communication device, the composite frames forming a composite stream by compositing the encoded video content into the source image, wherein for each composite frame, at least a portion of the source image included in that frame is encoded according to a selected frame type of that frame~ the frame type being selected from a plurality of frame types based on the frame type of a corresponding frame of the encoded video content; and
transmitting via a communication network the composite stream for display on a television associated with the request.

32. The method according to claim 31, wherein at least a portion of the source image is encoded in a MPEG format.

33. The method according to claim 32, wherein the video content is a series of MPEG frames.

34. The method according to claim 31, wherein the video content contains data representative of video images and data representative of an audio signal.

35. A method according to claim 31, wherein the source image is a web page.

36. The method according to claim 31, wherein the selected frame type of each encoded video frame is I-frame or P-frame.

37. The method according to claim 36, wherein the video content comprises a plurality of video sources, each video source having a plurality of video frames, and each encoded video frame includes, from each of the plurality of video sources, at least a portion of a video frame, the method further comprising:

selecting the frame type of the encoded video frame to be I-frame if the frame type of each of the included portions is also I-frame.

38. The method according to claim 36, wherein the video content comprises a plurality of video sources, each video source having a plurality of video frames, and each encoded video frame includes, from each of the plurality of video sources, at least a portion of a video frame, the method further comprising:

selecting the frame type of the encoded video frame to be P-frame if the frame type of at least one of the included portions is also P-frame.

39. The method according to claim 31, wherein selecting the frame type includes selecting based on the encoding type of one or more macroblocks of the portion of the frame.

40. A system for displaying video content as part of source image via a set-top box, wherein the set top box is capable of displaying the source image formatted according to a protocol, the system comprising:

an input for receiving a request addressed from a set-top box for video content including at least a plurality of video frames addressed on a source image;

an encoder for creating an encoded source image by encoding at least a portion of the source image in the protocol format according to a frame type;

a compositor for creating a composite video stream by selecting the encoding frame type from a plurality of frame types and splicing the encoded video content into the encoded source image according to the selected frame type, each frame of the composite video stream determining the frame type selected for encoding each frame of the source image; and an output for sending the video stream to the set-top box requesting the video content.

41. A system according to claim 40, wherein the set-top box can display content in an MPEG format.

42. A system according to claim 41, wherein the video content is encoded as an MPEG video stream.

43. A system according to claim 40, wherein the video content is pre-encoded in an MPEG video format prior to receiving the request for video content.

44. A system according to claim 40, wherein the source image is a web page.

45. The method according to claim 40, wherein the selected frame type of each encoded video frame is I-frame or P-frame.

46. The method according to claim 45, wherein the video content comprises a plurality of video sources, each video source having a plurality of video frames, and each encoded video frame includes, from each of the plurality of video sources, at least a portion of a video frame, the method further comprising:

selecting the frame type of the encoded video frame to be I-frame if the frame type of each of the included portions is also I-frame.

47. The method according to claim 45, wherein the video content comprises a plurality of video sources, each video source having a plurality of video frames, and each encoded video frame includes, from each of the plurality of video sources, at least a portion of a video frame, the method further comprising:

selecting the frame type of the encoded video frame to be P-frame if the frame type of at least one of the included portions is also P-frame.

48. The system according to claim 40, wherein selecting the frame type includes selecting based on the encoding type of one or more macroblocks of the portion of the frame.

\* \* \* \* \*